US012793613B2

(12) United States Patent
Wang et al.

(10) Patent No.: US 12,793,613 B2
(45) Date of Patent: Nov. 10, 2026

(54) DRIVING METHOD AND APPARATUS FOR DISPLAY PANEL AND DISPLAY DEVICE

(71) Applicant: Visionox Technology Inc., Kunshan (CN)

(72) Inventors: Yuqing Wang, Kunshan (CN); Deqiang Zhang, Kunshan (CN); Zhisong Sun, Kunshan (CN); Tao Tang, Kunshan (CN); Xiaoping Tan, Kunshan (CN)

(73) Assignee: Visionox Technology Inc., Kunshan (CN)

( * ) Notice: Subject to any disclaimer, the term of this patent is extended or adjusted under 35 U.S.C. 154(b) by 0 days.

(21) Appl. No.: 18/977,964

(22) Filed: Dec. 12, 2024

(65) Prior Publication Data

US 2025/0111825 A1 Apr. 3, 2025

(30) Foreign Application Priority Data

Dec. 19, 2023 (CN) ......................... 202311744940.7

(51) Int. Cl.
*G09G 3/32* (2016.01)
*G09G 3/20* (2006.01)

(52) U.S. Cl.
CPC ............. *G09G 3/32* (2013.01); *G09G 3/2074* (2013.01); *G09G 2300/0842* (2013.01); (Continued)

(58) Field of Classification Search
CPC ......... G09G 3/3233; G09G 2320/0233; G09G 2320/02; G09G 2340/0435; G09G 2320/0247
See application file for complete search history.

(56) References Cited

U.S. PATENT DOCUMENTS 10,170,037 B2 * 1/2019 Choi .................... G09G 3/3233
2004/0183483 A1 * 9/2004 Inoue .................. G09G 3/3233
315/366

(Continued)

FOREIGN PATENT DOCUMENTS

CN 106663402 A 5/2017
CN 106782268 A 5/2017

(Continued)

OTHER PUBLICATIONS

Office Action of Chinese Patent Application No. 202311744940.7 Dated Jan. 26, 2024.

(Continued)

*Primary Examiner* — Bipin Gyawali
(74) *Attorney, Agent, or Firm* — Kilpatrick Townsend & Stockton LLP

(57) ABSTRACT

A display region of a display panel at least includes a first display sub-region and a second display sub-region. A driving method for a display panel includes: in the case where a change degree of display-related parameters of at least two refresh frames in the second display sub-region is greater than a set degree, refreshing the first display sub-region and/or performing display compensation on the first display sub-region. When the change degree of the display-related parameters of the at least two refresh frames in the second display sub-region is greater than the set degree to cause a change in the display brightness of the first display sub-region, the first display sub-region is refreshed, and/or the display compensation is performed on the first display sub-region.

20 Claims, 9 Drawing Sheets

(52) U.S. Cl.
CPC ............... *G09G 2300/0861* (2013.01); *G09G 2320/0223* (2013.01); *G09G 2320/0247* (2013.01); *G09G 2340/0435* (2013.01)

(56) References Cited

U.S. PATENT DOCUMENTS

| | | | | |
|---|---|---|---|---|
| 2008/0012811 | A1* | 1/2008 | Sung | G09G 3/3291 345/89 |
| 2015/0255019 | A1* | 9/2015 | Park | G09G 3/3225 345/208 |
| 2016/0042708 | A1* | 2/2016 | Wang | G09G 3/3611 345/214 |
| 2016/0189628 | A1* | 6/2016 | Choi | G09G 3/3233 345/77 |
| 2020/0152119 | A1* | 5/2020 | Xuan | G09G 3/3233 |
| 2021/0158755 | A1* | 5/2021 | Li | G09G 3/3233 |
| 2022/0139330 | A1* | 5/2022 | Kwon | G06F 3/1431 345/204 |
| 2023/0122681 | A1* | 4/2023 | Park | G09G 3/3233 345/690 |
| 2023/0335059 | A1* | 10/2023 | Mi | G09G 3/3233 |
| 2023/0335064 | A1 | 10/2023 | Her et al. | |

FOREIGN PATENT DOCUMENTS

| | | | |
|---|---|---|---|
| CN | 112581901 | A | 3/2021 |
| CN | 114333675 | A | 4/2022 |
| CN | 115100992 | A | 9/2022 |
| CN | 115985225 | A | 4/2023 |
| CN | 116665592 | A | 8/2023 |
| CN | 116682343 | A | 9/2023 |
| CN | 117079606 | A | 11/2023 |

OTHER PUBLICATIONS

Notice of Allowance of Chinese Patent Application No. 202311744940.7 Dated Feb. 28, 2024.

* cited by examiner

DRIVING METHOD AND APPARATUS FOR DISPLAY PANEL AND DISPLAY DEVICE

This application claims priority to Chinese Patent Application No. 202311744940.7 filed Dec. 19, 2023, the disclosure of which is incorporated herein by reference in its entirety.

TECHNICAL FIELD

The present application relates to the field of display technology and, in particular, to a driving method and apparatus for a display panel and a display device.

BACKGROUND

A display device includes a display panel, a display driver chip, a power chip and others. The display driver chip controls the display panel to display, the power chip provides corresponding voltages for the display driver chip and the display panel. The display driver chip may be electrically connected to data lines on the display panel to output data signals to the data lines. The display driver chip may also be electrically connected to scan circuits on the display panel to output clock signals, start signals and others to the scan circuits to enable the scan circuits to output scan signals to scan lines on the display panel. The display panel may include pixel circuits arranged in an array. The pixel circuits are electrically connected to the data lines and the scan lines. Switch transistors in the pixel circuits are turned on in response to the scan signals on the scan lines so that data signals can be transmitted to gates of drive transistors. The drive transistors may generate drive currents according to voltages at the gates of the drive transistors to drive light-emitting diodes to emit light.

Currently, in the application of display devices such as mobile phones, split-screen display is used in many application scenarios, such as watching videos while reading fictions, and frequencies required for two scenarios displayed in a split-screen manner are different for most of the time. For example, reading fictions may only require a 10 Hz refresh or lower refresh, watching videos requires a 36 Hz refresh or 60 Hz refresh, and playing games requires a 60 Hz refresh or higher refresh.

However, the existing display devices have a screen flickering problem.

SUMMARY

The present application provides a driving method and apparatus for a display panel and a display device.

According to an aspect of the present application, a driving method for a display panel is provided. A display region of the display panel at least includes a first display sub-region and a second display sub-region, and the driving method for a display panel includes a step below.

In a case where a change degree of display-related parameters of at least two refresh frames in the second display sub-region is greater than a set degree, the driving method for the display panel includes: refreshing the first display sub-region, or performing display compensation on the first display sub-region.

In some embodiments, the display-related parameter includes at least one of a grayscale value, a gamma register value, and a data voltage.

In some embodiments, a refresh rate of the first display sub-region is less than a refresh rate of the second display sub-region.

In some embodiments, the driving method for the display panel includes: in response to the change degree of the display-related parameters of the at least two refresh frames in the second display sub-region being greater than the set degree, refreshing the first display sub-region to increase a number of refresh times of the first display sub-region.

In some embodiments, the driving method for the display panel includes: in response to the change degree of the display-related parameters of the at least two refresh frames in the second display sub-region being less than or equal to the set degree, refreshing the first display sub-region once within a first time period, where the first time period is equal to a refresh cycle of the first display sub-region; and in response to the change degree of the display-related parameters of the at least two refresh frames in the second display sub-region being greater than the set degree, refreshing the first display sub-region at least twice within the first time period.

In some embodiments, the driving method for the display panel includes: in response to the change degree of the display-related parameters of the at least two refresh frames in the second display sub-region being greater than the set degree, adjusting a compensation value of the display compensation performed on the first display sub-region, and refreshing the first display sub-region.

In some embodiments, the driving method for the display panel includes: in a first display frame, calculating the compensation value of the display compensation performed on the first display sub-region and a compensation value of display compensation performed on the second display sub-region, and refreshing the first display sub-region and the second display sub-region.

In some embodiments, the driving method for the display panel includes: in a second display frame, refreshing the second display sub-region, and the first display sub-region is in a retention mode.

In some embodiments, in the second display frame, the compensation value of the display compensation performed on the second display sub-region is a compensation value of display compensation performed on the second display sub-region in a previous frame.

In some embodiments, one or more second display frames are set between two adjacent first display frames.

In some embodiments, the driving method for the display panel includes: in response to the change degree of the display-related parameters of the at least two refresh frames in the second display sub-region being greater than the set degree, refreshing the first display sub-region to increase a number of first display frames.

In some embodiments, the driving method for the display panel includes: in response to the change degree of the display-related parameters of the at least two refresh frames in the second display sub-region being less than or equal to the set degree, providing one first display frame within a first time period, where the first time period is equal to a refresh cycle of the first display sub-region; in response to the change degree of the display-related parameters of the at least two refresh frames in the second display sub-region being greater than the set degree, providing at least two first display frames within the first time period.

In some embodiments, the at least two refresh frames include a current frame and at least one frame previous to and adjacent to the current frame, a time interval between the current frame and a previous first display frame is less than the first time period, and in response to the change degree of the display-related parameters of the at least two refresh frames in the second display sub-region being greater than the set degree, the current frame is the first display frame; in response to the change degree of the display-related parameters of the at least two refresh frames in the second display sub-region being less than or equal to the set degree, the current frame is the second display frame.

In some embodiments, the driving method for the display panel includes: in response to the change degree of the display-related parameters of the at least two refresh frames in the second display sub-region being greater than the set degree, performing the display compensation on the first display sub-region by performing compensation on a data voltage of the first display sub-region.

In some embodiments, a compensation value of the data voltage of the first display sub-region is related to a voltage drop on a first power voltage signal line.

In some embodiments, a sub-pixel in the first display sub-region includes a pixel circuit and a light-emitting device, where the pixel circuit is connected between the first power voltage signal line and the light-emitting device.

In some embodiments, the compensation value of the data voltage of the first display sub-region is equal to the voltage drop on the first power voltage signal line.

In some embodiments, that the display compensation is performed on the first display sub-region includes: determining the voltage drop on the first power voltage signal line according to a resistor string model of the display panel, a position of the sub-pixel in the first display sub-region in the display panel and a current value on the first power voltage signal line corresponding to the sub-pixel in the first display sub-region, where the current value on the first power voltage signal line corresponding to the sub-pixel in the first display sub-region is at least determined according to a grayscale value of a current frame of a sub-pixel in the second display sub-region; determining a compensated data voltage of the sub-pixel in the first display sub-region according to a grayscale value of a current frame of the sub-pixel in the first display sub-region and the voltage drop on the corresponding first power voltage signal line; and writing the compensated data voltage into the sub-pixel in the first display sub-region.

In some embodiments, the driving method for a display panel further includes: storing display-related parameters of a current frame of a sub-pixel in the second display sub-region and one or more frames previous to and adjacent to the current frame.

In some embodiments, the display-related parameter includes a grayscale value; in response to a change degree of grayscale values of the at least two refresh frames in the second display sub-region being greater than a set degree, a drive current of a sub-pixel in the first display sub-region decreases under a compensated data voltage of the first display sub-region, when a change trend decreases; in response to a change degree of grayscale values of the at least two refresh frames in the second display sub-region being greater than a set degree, the drive current of the sub-pixel in the first display sub-region increases under the compensated data voltage of the first display sub-region, when the change trend increases.

In some embodiments, the second display sub-region includes m sub-pixels, where m is a positive integer greater than 1, wherein in response to the change degree of the display-related parameters of the at least two refresh frames in the second display sub-region being greater than the set degree, refreshing the first display sub-region or performing the display compensation on the first display sub-region includes: in response to an absolute value of an average value of differences between a display-related parameter of a current frame of the m sub-pixels in the second display sub-region and a display-related parameter of a previous frame of the m sub-pixels in the second display sub-region being greater than a set difference, refreshing the first display sub-region in the current frame, or performing the display compensation on the first display sub-region in the current frame.

According to another aspect of the present application, a driving apparatus for a display panel is provided. A display region of the display panel at least includes a first display sub-region and a second display sub-region, and the driving apparatus for a display panel includes a drive module.

The drive module is configured to, in a case where a change degree of display-related parameters of at least two refresh frames in the second display sub-region is greater than a set degree, refresh the first display sub-region or perform display compensation on the first display sub-region.

According to another aspect of the present application, a display device is provided. The display device includes a display panel and the preceding driving apparatus for a display panel. The driving apparatus for a display panel is configured to perform the driving method for a display panel of any one of the preceding solutions.

In technical solutions of embodiments of the present application, when the change degree of the display-related parameters of the at least two refresh frames in the second display sub-region is greater than the set degree to cause a change in the display brightness of the first display sub-region, the first display sub-region is refreshed, and/or the display compensation is performed on the first display sub-region to perform compensation on the change in the brightness of the first display sub-region due to the IR drop. For example, when a white image is switched to a black image in the second display sub-region, a screen current decreases, decreasing a voltage drop of the first display sub-region and brightening the display brightness of the first display sub-region. The first display sub-region is refreshed, and/or the display compensation is performed on the first display sub-region so that the brightness of a refreshed image and/or compensated image can at least partially offset a caused brightening degree of an image in the first display sub-region when images are switched in the second display sub-region.

It is to be understood that the content described in this section is neither intended to identify key or critical features of the embodiments of the present application nor intended to limit the scope of the present application. Other features of the present application become easily understood through the description provided hereinafter.

BRIEF DESCRIPTION OF DRAWINGS

To illustrate the technical solutions of embodiments of the present application more clearly, drawings used in the description of the embodiments are briefly described hereinafter. Apparently, the drawings described hereinafter illustrate part of the embodiments of the present application, and those of ordinary skill in the art may obtain other drawings based on the drawings described hereinafter on the premise that no creative work is done.

DETAILED DESCRIPTION

To make the technical solutions of the present application better understood by those skilled in the art, the technical solutions of embodiments of the present application are described hereinafter clearly and completely in conjunction with the drawings in embodiments of the present application. Apparently, the embodiments described hereinafter are part, not all, of embodiments of the present application. Based on the embodiments of the present application, all other embodiments obtained by those of ordinary skill in the art are within the scope of the present application on the premise that no creative work is done.

It is to be noted that terms such as "first" and "second" in the description, claims and drawings of the present application are used for distinguishing between similar objects and are not necessarily used for describing a particular order or sequence. It is to be understood that data used in this manner are interchangeable where appropriate so that the embodiments of the present application described herein can be implemented in an order not illustrated or described herein. In addition, terms "comprising", "including" and any variation thereof are intended to encompass a non-exclusive inclusion. For example, a process, method, system, product, or device that includes a series of steps or units not only includes the expressly listed steps or units, but may also include other steps or units that are not expressly listed or are inherent to such a process, method, product, or device.

Figure 1:
FIG. 1 is a diagram illustrating the arrangement of display frames in a partitioned multi-frequency application scenario.

FIG. 1 is a diagram illustrating the arrangement of display frames in a partitioned multi-frequency application scenario. In the related art, referring to FIG. 1, refresh frames of the display panel include global refresh frames F1 and local refresh frames F2. The global refresh frames F1 refresh a low refresh rate region and a high refresh rate region. The local refresh frames F2 refresh the high refresh rate region and do not refresh the low refresh rate region, resulting in a screen flickering phenomenon in the low refresh rate region. Through research, the inventors have found that the reason for this is voltage drops (IR drops) on signal lines for transmitting voltages in the display panel.

Figure 2:
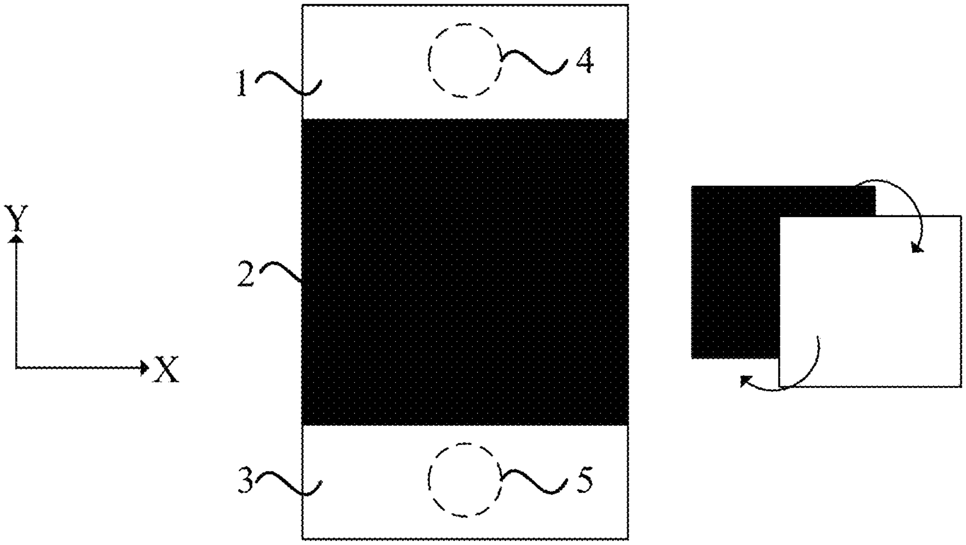
FIG. 2 is a diagram illustrating the partitions of a display panel.
Figure 3:
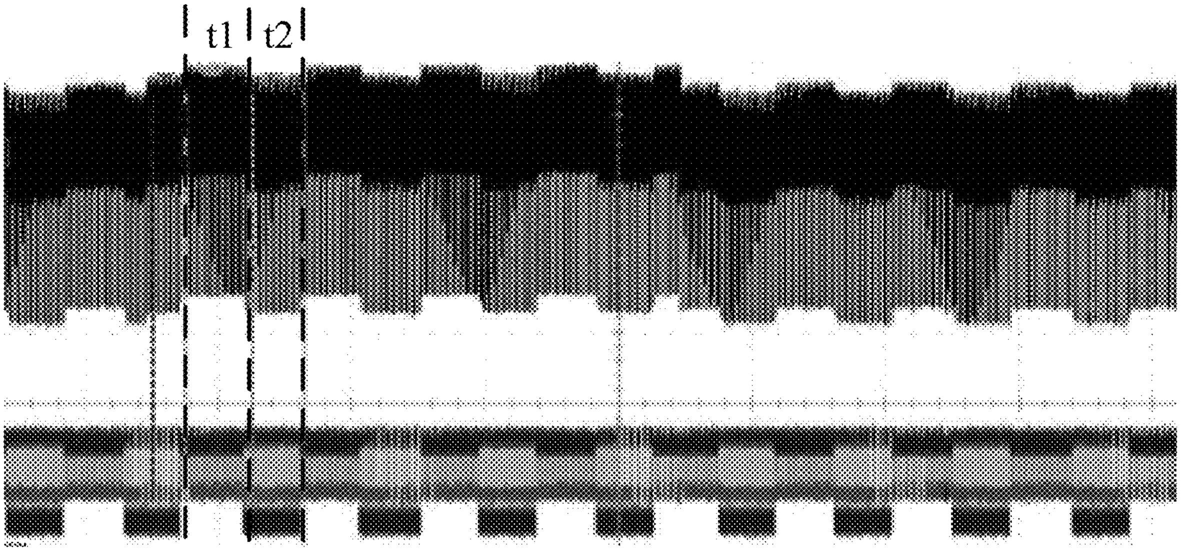
FIG. 3 is a simulation graph of brightness of a first measurement position in a display panel.

FIG. 2 is a diagram illustrating the partitions of a display panel. FIG. 3 is a simulation graph of brightness of a first measurement position in a display panel. In FIG. 3, the upper part of the graph is a brightness change diagram of the first measurement position in a first display sub-region 1 over time, and the lower part of the graph is a waveform of the magnitude of a data voltage written into a pixel circuit in a second display sub-region 2. Referring to FIGS. 2 and 3, a display region is divided into the first display sub-region 1, the second display sub-region 2 and a third display sub-region 3. The first display sub-region 1 and the third display sub-region 3 have the same refresh rate, and the refresh rate of the first display sub-region 1 and the third display sub-region 3 is less than the refresh rate of the second display sub-region 2. The first measurement position 4 is located in the first display sub-region 1. When the high refresh rate region, that is, the second display sub-region 2, is refreshed, data voltages and brightness of the first display sub-region 1 and the third display sub-region 3 remain unchanged and same as data voltages and brightness in the previous frame due to the low refresh rate of low refresh rate regions such as the first display sub-region 1 and the third display sub-region 3. As image refreshes in the high refresh rate region proceed, when images are switched in the second display sub-region 2, for example, in stage t1 in which a white image is switched to a black image, a screen current becomes smaller so that the voltage drops on the signal lines can decrease, and the first display sub-region 1 and the third display sub-region 3 have decreased voltage drops, causing first power voltages transmitted to positions of sub-pixels in the first display sub-region 1 and the third display sub-region 3 to become larger, causing absolute values of gate-source voltage differences of drive transistors in the sub-pixels in the first display sub-region 1 and the third display sub-region 3 to increase, causing drive currents generated by the drive transistors in the sub-pixels in the first display sub-region 1 and the third display sub-region 3 to increase and causing images of the first display sub-region 1 and the third display sub-region 3 to brighten. In stage t2 in which the black image is switched to the white image in the second display sub-region 2, the screen current becomes larger so that the voltage drops on the signal lines increase, and the first display sub-region 1 and the third display sub-region 3 have increased voltage drops, causing the first power voltages transmitted to the positions of the sub-pixels in the first display sub-region 1 and the third display sub-region 3 to become smaller, causing the absolute values of the gate-source voltage differences of the drive transistors in the sub-pixels in the first display sub-region 1 and the third display sub-region 3 to decrease, causing the drive currents generated by the drive transistors in the sub-pixels in the first display sub-region 1 and the third display sub-region 3 to decrease and causing the images of the first display sub-region 1 and the third display sub-region 3 to darken. Therefore, when black and white images are switched in the high refresh rate region, a screen flickering phenomenon is prone to occur in the first display sub-region 1 and the third display sub-region 3.

Figure 4:
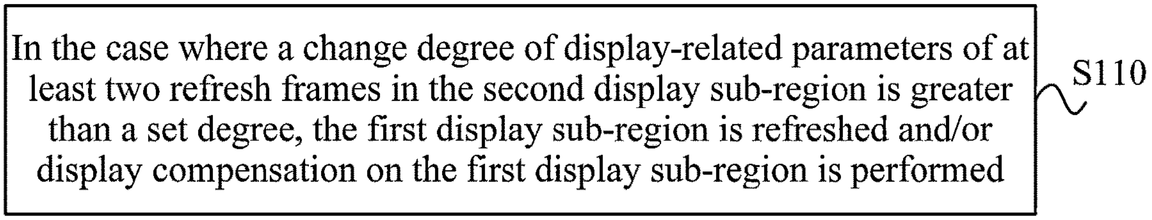
FIG. 4 is a flowchart of a driving method for a display panel according to one or more embodiments of the present application.

In view of the preceding technical problems, the present application provides a driving method for a display panel to improve a screen flickering phenomenon in a low refresh rate region. FIG. 4 is a flowchart of a driving method for a display panel according to one or more embodiments of the present application. Referring to FIGS. 2 and 4, the display region of the display panel at least includes the first display sub-region 1 and the second display sub-region 2. The driving method for a display panel includes a step below.

In S110, in the case where a change degree of display-related parameters of at least two refresh frames in the second display sub-region 2 is greater than a set degree, the first display sub-region 1 is refreshed, and/or display compensation is performed on the first display sub-region 1.

The display panel includes multiple sub-pixels. The display region may be divided into the first display sub-region 1 and the second display sub-region 2 in the row direction X of arranging the multiple sub-pixels and may also be divided into the first display sub-region 1 and the second display sub-region 2 in the column direction Y of arranging the multiple sub-pixels. Exemplarily, as shown in FIG. 2, the display region of the display panel may also include multiple display sub-regions such as the first display sub-region 1, the second display sub-region 2 and the third display sub-region 3. The display panel may also include a frequency-modulating scan circuit through which a scan signal including a conduction pulse may be transmitted to a to-be-refreshed region requiring refresh and a scan signal transmitted to a retention region requiring no refresh is a continuous cut-off potential.

Optionally, the display-related parameter includes at least one of a grayscale value, a gamma register value, and a data voltage. The display-related parameter may also include other equivalent parameters such as a brightness value and a drive current of a light-emitting device, which is not specifically limited.

The grayscale value, the gamma register value, or the data voltage affects the light-emitting brightness of a sub-pixel in the display panel. Therefore, in the case where a change degree of grayscale values of the at least two refresh frames in the second display sub-region 2 is greater than a set degree, and/or in the case where a change degree of gamma register values of the at least two refresh frames in the second display sub-region 2 is greater than a set degree, and/or in the case where a change degree of data voltages of the at least two refresh frames in the second display sub-region 2 is greater than a set degree, these may cause a large change in the light-emitting brightness of at least two frames in the first display sub-region 1, resulting in a screen flickering phenomenon. In this case, the first display sub-region 1 requires refreshing, compensation, or refresh plus compensation. The change degree of the display-related parameters of the at least two refresh frames in the second display sub-region 2 is greater than the set degree. The at least two refresh frames may be two frames that may be adjacent to each other or may also be not adjacent to each other, which is not specifically limited.

In the case where the change degree of the display-related parameters of the at least two refresh frames in the second display sub-region 2 is greater than the set degree, the first display sub-region 1 is refreshed, that is, a data write is performed on the first display sub-region 1 so that the number of refresh times of the first display sub-region 1 is increased, that is, the number of times of writing data voltages into sub-pixels in the first display sub-region 1 is increased, and that is, the current frame of the first display sub-region 1 is replaced from a retention frame to a refresh frame, facilitating the improvement in leakage phenomena at gates of drive transistors in the sub-pixels, alleviating uniform display of different frames due to the leakage of the sub-pixels and thereby improving the screen flickering phenomenon.

Alternatively, in the case where the change degree of the display-related parameters of the at least two refresh frames in the second display sub-region 2 is greater than the set degree, the first display sub-region 1 is refreshed, and if the current frame of the first display sub-region 1 is originally a refresh frame, the type of the current frame of the first display sub-region 1 is unchanged, and the number of refresh times of the first display sub-region 1 is unchanged; if the current frame of the first display sub-region 1 is originally a retention frame, the current frame of the first display sub-region 1 is replaced from the retention frame to the refresh frame, the type of the current frame of the first display sub-region 1 is changed, and the number of refresh times of the first display sub-region 1 is increased.

Alternatively, in the case where the change degree of the display-related parameters of the at least two refresh frames in the second display sub-region 2 is greater than the set degree, compensation is performed on initialization voltages of first electrodes (such as anodes) of light-emitting devices in the sub-pixels in the first display sub-region 1. Exemplarily, when the change degree of the display-related parameters of the at least two refresh frames in the second display sub-region 2 is greater than the preset degree to cause the screen current to become larger, such as when the black image is switched to the white image in the second display sub-region 2, the initialization voltages of the first electrodes of the light-emitting devices in the sub-pixels in the first display sub-region 1 are decreased to perform compensation on the amount of the brightness change when the display brightness of the first display sub-region 1 becomes smaller due to the image refreshes of the second display sub-region 2; when the change degree of the display-related parameters of the at least two refresh frames in the second display sub-region 2 is greater than the preset degree to cause the screen current to become smaller, such as when the white image is switched to the black image in the second display sub-region 2, the initialization voltages of the first electrodes of the light-emitting devices in the sub-pixels in the first display sub-region 1 are increased to perform compensation on the amount of the brightness change when the display brightness of the first display sub-region 1 becomes larger due to the image refreshes of the second display sub-region 2. Compensation may be performed on the brightness change in the sub-pixels in the first display sub-region 1 by performing the compensation on the magnitude of the initialization voltages of the first electrodes of the light-emitting devices in the sub-pixels in the first display sub-region 1 to improve the screen flickering phenomenon.

Alternatively, in the case where the change degree of the display-related parameters of the at least two refresh frames in the second display sub-region 2 is greater than the set degree, the first display sub-region 1 is refreshed while compensation is performed on a data voltage of the first display sub-region 1. The number of refresh times of the first display sub-region 1 is increased to improve the leakage phenomena at the gates of the drive transistors in the sub-pixels. When the change degree of the display-related parameters of the at least two refresh frames in the second display sub-region 2 is greater than the preset degree to cause the screen current to become larger, such as when the black image is switched to the white image in the second display sub-region 2, the magnitude of the data voltage of the sub-pixels in the first display sub-region 1 is adjusted to provide convenience for the written data voltage to enable the light-emitting brightness of the sub-pixels to increase so as to improve a darkening phenomenon in the first display sub-region 1 due to the images switched in the second display sub-region 2; when the change degree of the display-related parameters of the at least two refresh frames in the second display sub-region 2 is greater than the preset degree to cause the screen current to become smaller, such as when the white image is switched to the black image in the second display sub-region 2, the magnitude of the data voltage of the sub-pixels in the first display sub-region 1 is adjusted to provide convenience for the written data voltage to enable the light-emitting brightness of the sub-pixels to decrease so as to improve a brightening phenomenon in the first display sub-region 1 due to the images switched in the second display sub-region 2.

In the technical solutions of the embodiments of the present application, when the change degree of the display-related parameters of the at least two refresh frames in the second display sub-region is greater than the set degree to cause a change in the display brightness of the first display sub-region, the first display sub-region is refreshed, and/or the display compensation is performed on the first display sub-region to perform compensation on the change in the brightness of the first display sub-region due to the IR drop. For example, when the white image is switched to the black image in the second display sub-region, the screen current decreases, decreasing a voltage drop of the first display sub-region and brightening the display brightness of the first display sub-region. In this case, the first display sub-region is refreshed, and/or the display compensation is performed on the first display sub-region so that the brightness of a refreshed image and/or compensated image can at least partially offset a caused brightening degree of an image in the first display sub-region when the images are switched in the second display sub-region, thereby improving the screen flickering phenomenon and improving the display effect when the display panel is displayed in partitions and multiple frequencies.

Optionally, the display-related parameter includes the grayscale value. When the change degree of the grayscale values of the at least two refresh frames in the second display sub-region is greater than the set degree, a drive current of a sub-pixel in the first display sub-region decreases under a compensated data voltage of the first display sub-region, when a change trend decreases; when the change degree of the grayscale values of the at least two refresh frames in the second display sub-region is greater than the set degree, the drive current of the sub-pixel in the first display sub-region increases under the compensated data voltage of the first display sub-region, when the change trend increases.

The change trend being decreasing may be understood that between the at least two refresh frames in the second display sub-region, the grayscale value of a latter frame is less than the grayscale value of a former frame. Exemplarily, the decreasing change trend of the at least two refresh frames in the second display sub-region may correspond to the case where the white image is switched to the black image in the second display sub-region, so the screen current decreases, a voltage drop on a first power voltage signal line in the first display sub-region decreases, and the image in the first display sub-region is brightened. Therefore, to avoid brightening the image in the first display sub-region, the compensated data voltage in the first display sub-region should be enabled to cause the drive currents of the sub-pixels in the first display sub-region to become smaller, thereby at least partially offsetting the caused brightening degree of the image in the first display sub-region when the images are switched in the second display sub-region. The change trend being increasing may be understood that between the at least two refresh frames in the second display sub-region, the grayscale value of the latter frame is greater than the grayscale value of the former frame. Exemplarily, the increasing change trend of the at least two refresh frames in the second display sub-region may correspond to the case where the black image is switched to the white image in the second display sub-region, so the screen current increases, the voltage drop in the first display sub-region increases, and the image in the first display sub-region is darkened. Therefore, to avoid darkening the image in the first display sub-region, the compensated data voltage in the first display sub-region should be enabled to cause the drive currents of the sub-pixels in the first display sub-region to increase, thereby at least partially offsetting a caused darkening degree of the image in the first display sub-region when the images are switched in the second display sub-region.

Figure 5:
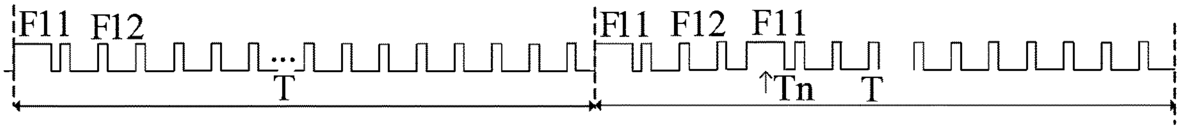
FIG. 5 is a diagram illustrating the arrangement of display frames in a partitioned multi-frequency application scenario according to one or more embodiments of the present application.

FIG. 5 is a diagram illustrating the arrangement of display frames in a partitioned multi-frequency application scenario according to one or more embodiments of the present application. Referring to FIGS. 2 and 5, optionally, the refresh rate of the first display sub-region 1 is less than the refresh rate of the second display sub-region 2. Exemplarily, in this embodiment, the display region further includes the third display sub-region 3, and the first display sub-region 1 and the third display sub-region 3 have the same refresh rate.

Exemplarily, the refresh rate of the first display sub-region 1 may be 1 Hz, and the refresh rate of the second display sub-region 2 is 120 Hz.

In the case where the change degree of the display-related parameters of the at least two refresh frames in the second display sub-region 2 is greater than the set degree, the first display sub-region 1 is refreshed to increase the number of refresh times of the first display sub-region 1. When the display region further includes the third display sub-region 3, the third display sub-region 3 is also a low refresh rate region, so in the case where the change degree of the display-related parameters of the at least two refresh frames in the second display sub-region 2 is greater than the set degree, the third display sub-region 3 is also refreshed to increase the number of refresh times of the third display sub-region 3. The third display sub-region 3 and the first display sub-region 1 have the same refresh state. The first display sub-region 1 is used as an example in the following description.

Using the refresh rate of the first display sub-region 1 being L as an example, the unit is Hz, and in the case where a change degree of the display-related parameters of two refresh frames in the second display sub-region 2 is greater than the set degree, the number of refresh times of the first display sub-region 1 is increased at least once. Exemplarily, using increasing the number of refresh times of the first display sub-region 1 once as an example, as shown in FIG. 5, one first display frame F11 and 119 second display frames F12 are included in a first cycle T, and in a second cycle T, the number of first display frames F11 is increased from one to two, and the number of second display frames F12 is changed from 119 to 118. A first display frame F11 may correspond to a refresh frame in the first display sub-region 1 and a refresh frame in the second display sub-region 2, and a second display frame F12 may correspond to a retention frame in the first display sub-region 1 and a refresh frame in the second display sub-region 2. In a time period Tn corresponding to a second first display frame F11 in the second cycle T, since the change degree between the display-related parameter of the current refresh frame and the display-related parameter of the previous refresh frame in the second display sub-region 2 is greater than the set degree, the current frame is replaced from a second display frame F12 to a first display frame F11. Exemplarily, if a case where the change degree of the display-related parameters of two refresh frames is greater than the set degree is present twice in the second display sub-region 2, the first display sub-region 1 is refreshed from L times per second to (L+2) times per second to improve the screen flickering phenomenon. L is a positive integer greater than 0.

Based on the preceding embodiments, with continued reference to FIG. 2, optionally, in the case where the change degree of the display-related parameters of the at least two refresh frames in the second display sub-region 2 is less than or equal to the set degree, the first display sub-region 1 is refreshed once within a first time period, where the first time period is equal to a refresh cycle T of the first display sub-region 1; in the case where the change degree of the display-related parameters of the at least two refresh frames in the second display sub-region 2 is greater than the set degree, the first display sub-region 1 is refreshed at least twice within the first time period.

The initialization refresh rate of the first display sub-region 1 being 1 Hz is used as an example. Within one refresh cycle of the first display sub-region 1, if the change degree of the display-related parameters of the at least two refresh frames in the second display sub-region 2 is less than or equal to the set degree, the first display sub-region 1 is refreshed in accordance with the initially set refresh rate and is refreshed once within the one refresh cycle. In the case where the change degree of the display-related parameters of the at least two refresh frames in the second display sub-region 2 is greater than the set degree, the number of refresh times of the first display sub-region 1 is increased so that the first display sub-region 1 is refreshed at least twice within the one refresh cycle of the first display sub-region 1.

Optionally, in the case where a change degree of display-related parameters of any at least two refresh frames in the second display sub-region is less than or equal to the set degree within the first time period, the first display sub-region is refreshed once within the first time period, where the first time period is equal to the refresh cycle of the first display sub-region; in the case where the change degree of the display-related parameters of the at least two refresh frames in the second display sub-region is greater than the set degree within the first time period, the first display sub-region is refreshed at least twice within the first time period.

Figure 6:
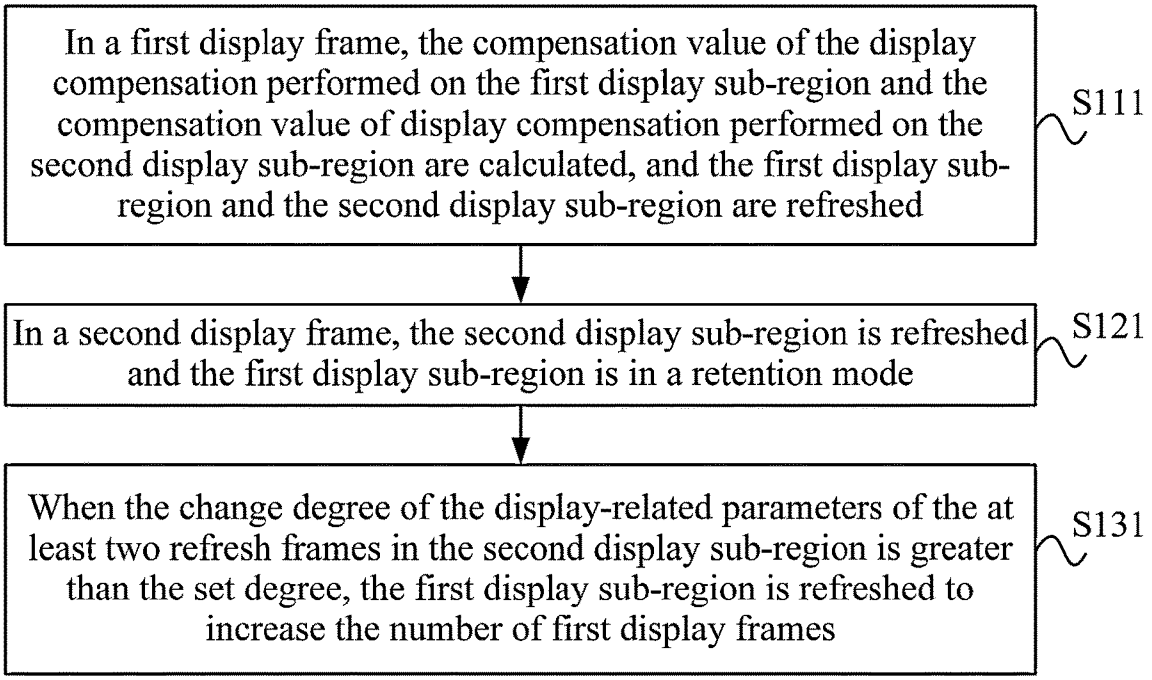
FIG. 6 is another flowchart of a driving method for a display panel according to one or more embodiments of the present application.

FIG. 6 is another flowchart of a driving method for a display panel according to one or more embodiments of the present application. Referring to FIGS. 2 and 6, optionally, when the change degree of the display-related parameters of the at least two refresh frames in the second display sub-region 2 is greater than the set degree, the compensation value of the display compensation performed on the first display sub-region 1 is adjusted, and the first display sub-region 1 is refreshed.

The driving method for a display panel includes the steps below.

In S111, in a first display frame, the compensation value of the display compensation performed on the first display sub-region 1 and the compensation value of display compensation performed on the second display sub-region 2 are calculated, and the first display sub-region 1 and the second display sub-region 2 are refreshed.

In the first display frame, the first display sub-region 1 and the second display sub-region 2 require refreshing. Before the refresh, according to the stored display-related parameter of the current frame, the compensation value of the display compensation performed on the first display sub-region 1 and the compensation value of display compensation performed on the second display sub-region 2 are calculated and updated. The first display frame may correspond to a refresh frame in the first display sub-region 1 and a refresh frame in the second display sub-region 2. The compensation value of the display compensation performed on the first display sub-region 1 and the compensation value of the display compensation performed on the second display sub-region 2 may be the compensation value of the data voltage of the sub-pixels in the first display sub-region 1 and the compensation value of a data voltage of sub-pixels in the second display sub-region 2 respectively. For example, the compensation values of the data voltages are related to voltage drops on first power voltage signal lines.

In S121, in a second display frame, the second display sub-region 2 is refreshed, and the first display sub-region 1 is in a retention mode.

The refresh rate of the first display sub-region 1 is less than the refresh rate of the second display sub-region 2, so the second display frame is present. In the second display frame, the second display sub-region 2 is refreshed, and the first display sub-region 1 is in the retention mode, which is equivalent to the maintenance of the state in the last refresh. The second display frame may correspond to a retention frame in the first display sub-region 1 and a refresh frame in the second display sub-region 2.

Optionally, in the second display frame, the compensation value of the display compensation performed on the second display sub-region 2 is the compensation value of display compensation performed on the second display sub-region 2 in the previous frame.

Specifically, in the second display frame, the second display sub-region 2 is refreshed, and compensation is performed on the second display sub-region 2; in the case where the change degree of the display-related parameters of the at least two refresh frames in the second display sub-region 2 is less than or equal to the set degree, the compensation is performed on the second display sub-region 2 with the calculated compensation value in the previous first display frame, that is, the compensation value of the display compensation performed on the second display sub-region 2 may be not updated in the second display frame.

One or more second display frames are set between two adjacent first display frames. In the case where the change degree of the display-related parameters of the at least two refresh frames is less than or equal to the set degree, the larger the number of second display frames between the two adjacent first display frames, the smaller the refresh rate of the first display sub-region 1.

In S131, when the change degree of the display-related parameters of the at least two refresh frames in the second display sub-region 2 is greater than the set degree, the first display sub-region 1 is refreshed to increase the number of first display frames.

Specifically, when the change degree of the display-related parameters of the at least two refresh frames in the second display sub-region 2 is greater than the set degree, this indicates that a change in the screen current in the at least two refresh frames in the second display sub-region 2 is large, which is prone to cause a large change in the brightness of the first display sub-region 1, resulting in the screen flickering phenomenon. Therefore, the first display sub-region 1 requires refreshing to conveniently perform data compensation on the first display sub-region 1 and improve the screen flickering phenomenon of the first display sub-region 1. As the number of refresh times of the first display sub-region 1 is increased within the one refresh cycle, the number of simultaneous refresh times of the first display sub-region 1 and the second display sub-region 2 is increased, that is, the number of first display frames is increased, and that is, the current frame is replaced from the second display frame to the first display frame.

In the case where the change degree of the display-related parameters of the at least two refresh frames in the second display sub-region 2 is less than or equal to the set degree, one first display frame is provided within the first time period, where the first time period is equal to the refresh cycle of the first display sub-region 1; in the case where the change degree of the display-related parameters of the at least two refresh frames in the second display sub-region 2 is greater than the set degree, at least two first display frames are provided within the first time period.

Specifically, in the case where the change degree of the display-related parameters of the at least two refresh frames in the second display sub-region 2 is less than or equal to the set degree, the number of refresh times of the first display sub-region 1 is not increased, and there is only one frame in which the first display sub-region 1 and the second display sub-region 2 are refreshed simultaneously within the refresh cycle of the first display sub-region 1. In the case where the change degree of the display-related parameters of the at least two refresh frames in the second display sub-region 2 is greater than the set degree, the number of refresh times of the first display sub-region 1 is increased to improve the screen flickering phenomenon, so the number of first display frames is increased. Therefore, the at least two first display frames are provided within the refresh cycle of the first display sub-region 1.

Optionally, the at least two refresh frames include the current frame and at least one frame previous to and adjacent to the current frame. The time interval between the current frame and the previous first display frame is less than the first time period. In the case where the change degree of the display-related parameters of the at least two refresh frames in the second display sub-region 2 is greater than the set degree, the current frame is a refresh frame of the first display sub-region 1; for example, the current frame is the first display frame, the current frame of the first display sub-region 1 is replaced from a retention frame to a refresh frame, or the current frame is replaced from the second display frame to the first display frame, that is, the type of the current frame requires changing; in the case where the change degree of the display-related parameters of the at least two refresh frames in the second display sub-region 2 is less than or equal to the set degree, the current frame is a retention frame of the first display sub-region 1; for example, the current frame is the second display frame, that is, the type of the current frame is not changed.

In the case where the change degree of the display-related parameters of the any at least two refresh frames in the second display sub-region is less than or equal to the set degree within the first time period, the one first display frame is provided within the first time period, where the first time period is equal to the refresh cycle of the first display sub-region; in the case where the change degree of the display-related parameters of the at least two refresh frames in the second display sub-region is greater than the set degree within the first time period, the at least two first display frames are provided the first time period.

With continued reference to FIG. 2, optionally, in a third display frame, the first display sub-region 1 is refreshed, and the second display sub-region 2 is in the retention mode. The third display frame may correspond to a refresh frame in the first display sub-region 1 and a retention frame in the second display sub-region 2.

One or more second display frames are disposed between two adjacent third display frames. The larger the number of second display frames between the two adjacent third display frames, the larger the refresh rate of the second display sub-region 2.

When the change degree of the display-related parameters of the at least two refresh frames in the second display sub-region 2 is greater than the set degree, the first display sub-region 1 is refreshed to increase the number of third display frames.

When the change degree of the display-related parameters of the at least two refresh frames in the second display sub-region 2 is less than or equal to the set degree, one third display frame is provided within the first time period, where the first time period is equal to the refresh cycle of the first display sub-region; when the change degree of the display-related parameters of the at least two refresh frames in the second display sub-region 2 is greater than the set degree, at least two third display frames are provided within the first time period.

The at least two refresh frames include the current frame and the at least one frame previous to and adjacent to the current frame. The time interval between the current frame and the previous third display frame is less than the first time interval. In the case where the change degree of the display-related parameters of the at least two refresh frames in the second display sub-region 2 is greater than the set degree, the current frame is a refresh frame of the first display sub-region 1; for example, the current frame is the third display frame or the first display frame; in the case where the change degree of the display-related parameters of the at least two refresh frames in the second display sub-region 2 is less than or equal to the set degree, the current frame is the retention frame of the first display sub-region 1; for example, the current frame is the second display frame.

Figure 7:
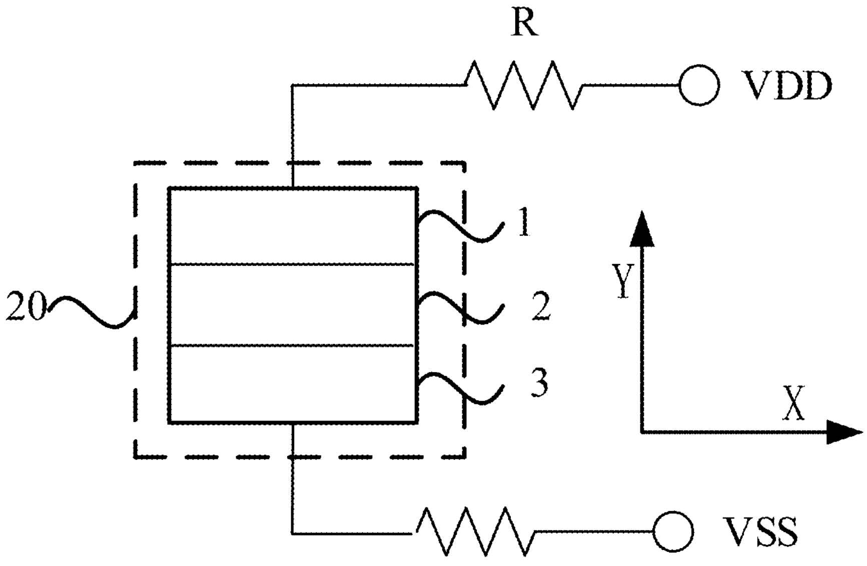
FIG. 7 is a diagram illustrating the principle of connecting a display panel to a first power voltage according to one or more embodiments of the present application.
Figure 8:
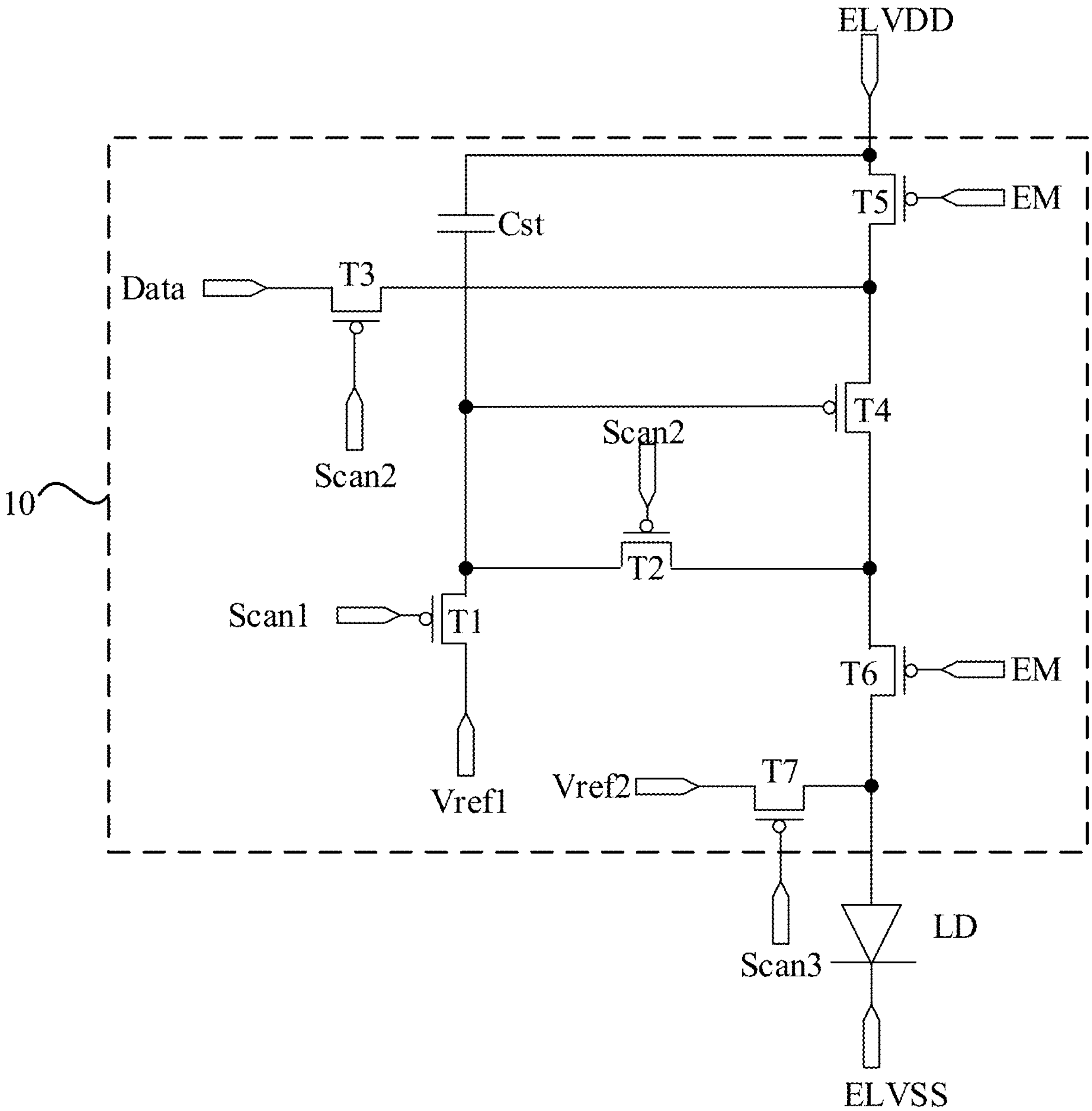
FIG. 8 is a diagram illustrating the structure of a pixel circuit in a display panel according to one or more embodiments of the present application.
Figure 9:
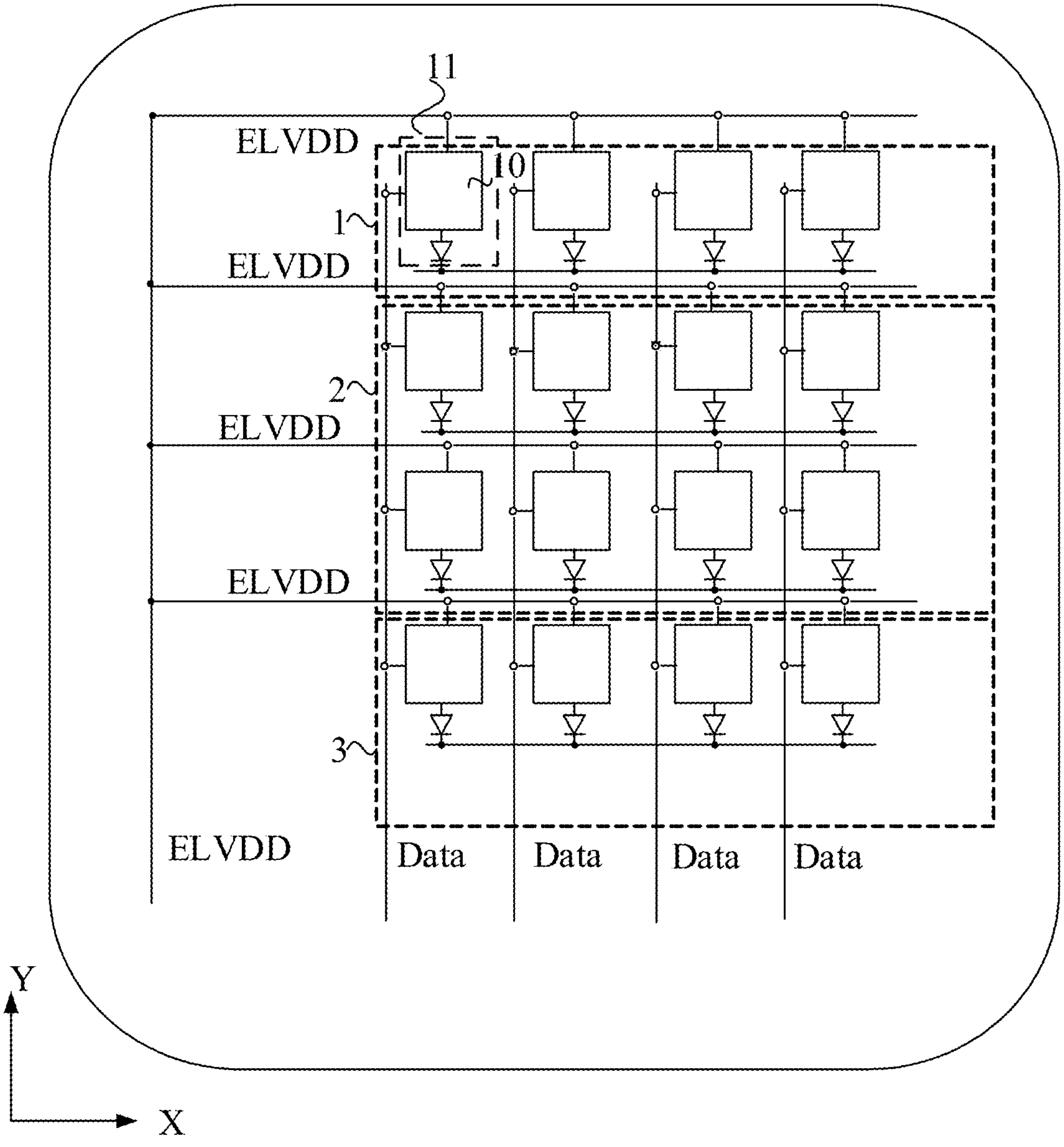
FIG. 9 is a top view of a display panel according to one or more embodiments of the present application.

FIG. 7 is a diagram illustrating the principle of connecting a display panel to a first power voltage according to one or more embodiments of the present application. FIG. 8 is a diagram illustrating the structure of a pixel circuit in a display panel according to one or more embodiments of the present application. FIG. 9 is a top view of a display panel according to one or more embodiments of the present application. Referring to FIGS. 2 and 7 to 9, optionally, the display panel 20 is connected to a first power voltage VDD and a second power voltage VSS. The display panel 20 includes the first display sub-region 1, the second display sub-region 2 and the third display sub-region 3, and resistors R are present on the first power voltage signal lines ELVDD, resulting in voltage losses in the first power voltage VDD transmitted to the multiple sub-pixels in different display sub-regions in the display panel 20. Optionally, in the case where the change degree of the display-related parameters of the at least two refresh frames in the second display sub-region 2 is greater than the set degree, the display compensation is performed on the first display sub-region 1 by performing compensation on the data voltage of the first display sub-region 1.

In the case where the change degree of the display-related parameters of the at least two refresh frames in the second display sub-region 2 is greater than the set degree, the display compensation is performed on the first display sub-region 1 by performing the compensation on the data voltage of the first display sub-region 1 in the current frame, which is equivalent to that the compensated data voltage is written into the corresponding sub-pixels in the first display sub-region, which is also equivalent to that the first display sub-region is refreshed.

Optionally, the compensation value of the data voltage of the first display sub-region 1 is related to the change degree of the display-related parameters of the at least two refresh frames in the second display sub-region 2. Exemplarily, the larger the change degree of the display-related parameters of the at least two refresh frames in the second display sub-region 2, the larger the absolute value of the compensation value of the data voltage of the first display sub-region 1. Exemplarily, the larger the absolute value of the difference between the grayscale value of the current frame of the second display sub-region 2 and the grayscale value of the previous frame of the second display sub-region 2, the larger the absolute value of the compensation value of the data voltage of the first display sub-region 1.

Optionally, the compensation value of the data voltage of the first display sub-region 1 is related to the voltage drop on a first power voltage signal line ELVDD. Exemplarily, the larger the voltage drop on the first power voltage signal line ELVDD, the larger the absolute value of the compensation value of the data voltage of the first display sub-region 1.

Optionally, a sub-pixel in the first display sub-region 1 includes a pixel circuit 10 and a light-emitting device LD, where the pixel circuit 10 is connected between the first power voltage signal line ELVDD and the light-emitting device LD.

Optionally, the compensation value of the data voltage of the first display sub-region 1 is equal or close to the voltage drop on the first power voltage signal line ELVDD.

Optionally, first power voltage signal lines ELVDD may be electrically connected to sub-pixels in the first display sub-region 1 and sub-pixels in the second display sub-region 2 respectively.

Optionally, the pixel circuit 10 may be electrically connected to a first electrode of the light-emitting device LD. A second electrode of the light-emitting device LD is connected to a second power voltage signal line ELVSS. The first power voltage signal line ELVDD is configured to provide the first power voltage VDD. The second power voltage signal line ELVSS is configured to provide the second power voltage VSS. One of the first power voltage VDD or the second power voltage VSS is a high voltage, and the other one of the first power voltage VDD or the second power voltage VSS is a low voltage. Exemplarily, the first power voltage VDD is greater than the second power voltage VSS. The pixel circuit 10 is further connected to a data line Data. The data line Data is configured to provide a data voltage.

The pixel circuit may include some or all of a gate initialization transistor T1, a compensation transistor T2, a data write transistor T3, a drive transistor T4, a first light emission control transistor T5, a second light emission control transistor T6, a second initialization transistor T7 and a storage capacitance Cst. The second initialization transistor T7 is configured to initialize the first electrode (such as the anode) of the light-emitting device LD. In other embodiments, the pixel circuit 10 may also have a 5T1C, 3T1C or another structure, which is not specifically limited herein. Exemplarily, in this embodiment, the pixel circuit has a 7T1C structure.

At least some first power voltage signal lines ELVDD may extend in the row direction X. At least some first power voltage signal lines ELVDD may extend in the column direction Y. At least some first power voltage signal lines ELVDD may extend in the row direction X and be arranged in the column direction Y. At least some first power voltage signal lines ELVDD may extend in the column direction Y and be arranged in the row direction X. The first power voltage signal lines ELVDD may be in the shape of a mesh. Multiple data lines Data may extend in the column direction Y and be arranged in the row direction X.

The drive transistor T4 generates the drive current according to the data voltage and the first power voltage to drive the light-emitting device LD to emit light. The light-emitting brightness of the light-emitting device LD corresponds to the drive current. The drive current is proportional to $(VDD\text{-}Vdata)^2$, that is, the light-emitting brightness is proportional to $(VDD\text{-}Vdata)^2$, where VDD denotes the first power voltage, and Vdata denotes the data voltage. In practical applications, due to design and wire reasons, the resistor exists on the signal line so that the display brightness can be proportional to $(VDD'\text{-}Vdata)^2$, and VDD'=VDD-E, where E denotes the voltage drop E on a respective first power voltage signal line ELVDD connected to a sub-pixel. According to the preceding formula, to solve the influence caused by the IR drop on the screen to make the light-emitting brightness of the sub-pixels unchanged, the compensation may be performed on the data voltage to satisfy that $(VDD\text{-}Vdata)^2=(VDD'\text{-}Vdata')^2$, and the magnitude of the compensated data voltage Vdata' is determined by the voltage drop E on the first power voltage signal line ELVDD. Moreover, as seen from the preceding formula, to enable the light-emitting brightness of the compensated light-emitting device LD to offset the influence of the change in the light-emitting brightness caused by the voltage drop, the compensation value of the data voltage is equal to the voltage drop E on the first power voltage signal line ELVDD.

A refresh frame of the pixel circuit may include a first reset stage, a data write stage, a second reset stage and a light emission stage.

In the first reset stage, a first scan signal Scan1 on a first scan line controls the gate initialization transistor T1 to turn on so that a first reset signal Vref1 can be transmitted to the gate of the drive transistor T4 through the gate initialization transistor T1 to reset the gate of the drive transistor T4.

In the data write stage, a second scan signal Scan2 on a second scan line controls the compensation transistor T2 and the data write transistor T3 to turn on, and the data voltage Vdata on the data line Data is transmitted to the gate of the drive transistor T4 through the data write transistor T3, a first electrode of the drive transistor T4 and a second electrode of the drive transistor T4 and the compensation transistor T2.

In the second reset stage, a third scan signal Scan3 on a third scan line controls the second initialization transistor T7 to turn on so that a second reset signal Vref2 can be transmitted to the first electrode of the light-emitting device LD through the second initialization transistor T7 to reset the first electrode of the light-emitting device LD.

In the light emission stage, a light emission control signal EM on a light emission control line controls the first light emission control transistor T5 and the second light emission control transistor T6 to turn on, and the drive transistor T4 generates the drive current according to the voltage at the gate of the drive transistor T4 to drive the light-emitting device LD to emit light.

A retention frame of the pixel circuit may include the second reset stage and the light emission stage. The retention frame of the pixel circuit may not include the first reset stage and the data write stage.

With continued reference to FIGS. 2, 7 and 8, optionally, that the display compensation is performed on the first display sub-region 1 includes the steps below.

The voltage drop on a first power voltage signal line ELVDD is determined according to a resistor string model of the display panel 20, a position of a sub-pixel in the first display sub-region 1 in the display panel and the current value on the first power voltage signal line ELVDD corresponding to the sub-pixel in the first display sub-region 1.

The current value on the first power voltage signal line ELVDD corresponding to the sub-pixel in the first display sub-region 1 is at least determined according to the grayscale value of the current frame of a sub-pixel in the second display sub-region 2. Specifically, the current value on the first power voltage signal line ELVDD corresponding to the sub-pixel in the first display sub-region 1 may be determined according to the grayscale value of the sub-pixel in the first display sub-region 1 in the current frame and the grayscale value of the current frame of the sub-pixel in the second display sub-region 2.

A compensated data voltage of the sub-pixel in the first display sub-region 1 is determined according to the grayscale value of the current frame of the sub-pixel in the first display sub-region 1 and the voltage drop on the corresponding first power voltage signal line ELVDD.

The compensated data voltage is written into the corresponding sub-pixel in the first display sub-region 1.

Grayscale values are in one-to-one correspondence with data voltages. Each grayscale value corresponds to a respective data voltage. The magnitude of a data voltage Vdata (which is equivalent to a data voltage before compensation) of a sub-pixel in the current frame may be determined according to the stored grayscale value of the sub-pixel of the current frame. After wires of the multiple sub-pixels and signal lines are completed in the display panel 20, the resistor string model of the first display panel 20 may be determined, and the resistor R on a first power voltage signal line ELVDD corresponding to the sub-pixel may be determined. The voltage drop E on the first power voltage signal line ELVDD in the position of a sub-pixel 11 satisfies that $E=I*R$, where I denotes the screen current determined according to the grayscale value of a sub-pixel in the second display sub-region 2 located in the same column as a to-be-compensated sub-pixel in the first display sub-region 1 in the current frame, and R denotes the resistor of a first power voltage signal line in the position of the to-be-compensated sub-pixel, and is determined by the resistor string model and the position of the to-be-compensated sub-pixel. As seen from the formula $(VDD-Vdata)^2=(VDD'-Vdata')^2$, the compensated data voltage $Vdata'=Vdata-E=Vdata-I*R$, where Vdata denotes a stored data voltage of the sub-pixel before the compensation in the current frame. After the compensated data voltage Vdata' of the to-be-compensated sub-pixel is determined, the compensated data voltage Vdata' is written into a data line Data connected to the to-be-compensated sub-pixel in the first display sub-region 1 to perform compensation on the display brightness of the to-be-compensated sub-pixel, thereby improving the screen flickering phenomenon.

The process of performing compensation on one sub-pixel 10 in the first display sub-region 1 is illustrated in the preceding, and compensation is also performed on other sub-pixels according to the preceding manner so that display compensation can be performed on each sub-pixel in the first display sub-region 1 finally.

Optionally, the at least two refresh frames in the second display sub-region include the current frame and one or more frames previous to and adjacent to the current frame, and in the case where the change degree of the display-related parameters of the at least two refresh frames in the second display sub-region is greater than the set degree, the first display sub-region is refreshed in the current frame, and/or the display compensation is performed on the first display sub-region in the current frame. Exemplarily, the at least two refresh frames in the second display sub-region include the current frame and k frames previous to and adjacent to the current frame; in the case where the sum of change degrees of display-related parameters of the current frame and the k frames previous to and adjacent to the current frame in the second display sub-region is greater than the set degree, the first display sub-region is refreshed in the current frame, and/or the display compensation is performed on the first display sub-region in the current frame. K may be equal to 2, 3, 4, or 5.

Based on the preceding embodiments, with continued reference to FIG. 2, optionally, the driving method for a display panel further includes that: Display-related parameters of the current frame of the sub-pixels in the second display sub-region 2 and one or more frames previous to and adjacent to the current frame are stored.

In the current frame (such as the (n+1)th frame), at least the display-related parameters of the current frame of the sub-pixels in the second display sub-region 2 and the one or more frames (such as the nth frame) previous to and adjacent to the current frame stored so that the display-related parameters of the current frame and the one or more frames (such as the nth frame) previous to and adjacent to the current frame can be obtained in the current frame (such as the (n+1)th frame), so that the change degree of the display-related parameters can be determined in the current frame (such as the (n+1)th frame), so that whether the first display sub-region 1 is refreshed in the current frame and/or the display compensation is performed on the first display sub-region 1 in the current frame can be determined, and so that whether the type of the current frame in the first display sub-region 1 is changed can be determined.

In the current frame, grayscale values of the current frame of the sub-pixels in the second display sub-region 2 and one or more frames previous to and adjacent to the current may be stored, which is not specifically limited.

With continued reference to FIG. 2, optionally, the second display sub-region 2 includes m sub-pixels, where m is a positive integer greater than 1, and that in the case where the change degree of the display-related parameters of the at least two refresh frames in the second display sub-region 2 is greater than the set degree, the first display sub-region 1 is refreshed and/or the display compensation is performed on the first display sub-region 1 includes that: In the case where the absolute value of the average value of differences between display-related parameters of the current frame of the m sub-pixels in the second display sub-region and display-related parameters of the previous frame of the m sub-pixels in the second display sub-region is greater than a set difference, the first display sub-region 1 is refreshed in the current frame, and/or the display compensation is performed on the first display sub-region 1 in the current frame.

The display-related parameter may include the grayscale value. Exemplarily, according to the stored grayscale value of the current frame of each sub-pixel in the second display sub-region 2 and the stored grayscale value of the previous frame of the each sub-pixel in the second display sub-region 2, the difference between the grayscale value of the current frame of the each sub-pixel and the grayscale value of the previous frame of the each sub-pixel is calculated, and the absolute value of the average value of the differences between grayscale values of the current frame of the m sub-pixels and grayscale values of the previous frame of the m sub-pixels is calculated. If the absolute value of the average value of the differences between the grayscale values is greater than the set difference, the first display sub-region 1 is refreshed in the current frame, or the display compensation is performed on the first display sub-region 1; or the first display sub-region 1 is refreshed, and the display compensation is performed on the first display sub-region 1.

If the absolute value of the average value of the differences between the display-related parameters of the current frame of the m sub-pixels in the second display sub-region and the display-related parameters of the previous frame of the m sub-pixels in the second display sub-region is less than or equal to the set difference, the type of the current frame of the first display sub-region 1 is not changed, and the number of refresh times of the first display sub-region 1 is not changed.

Figure 10:
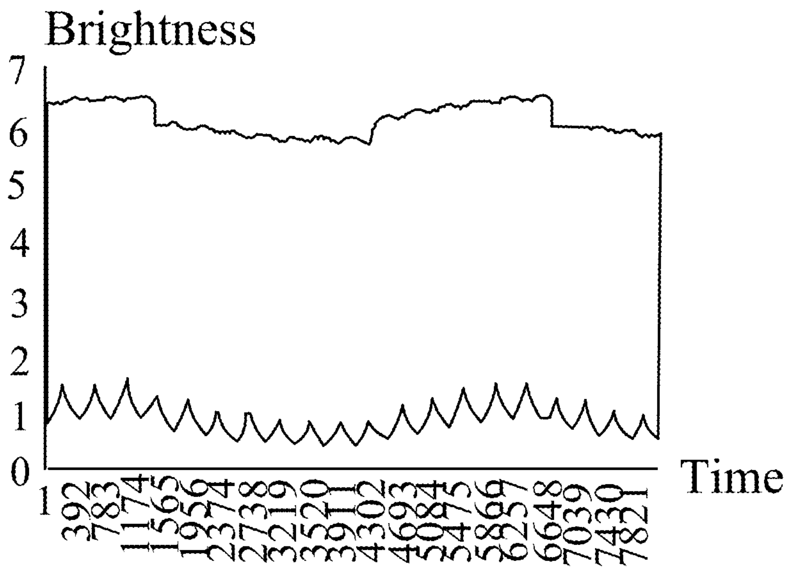
FIG. 10 is a simulation graph of brightness of a first measurement position in a first display sub-region before compensation according to one or more embodiments of the present application.
Figure 11:
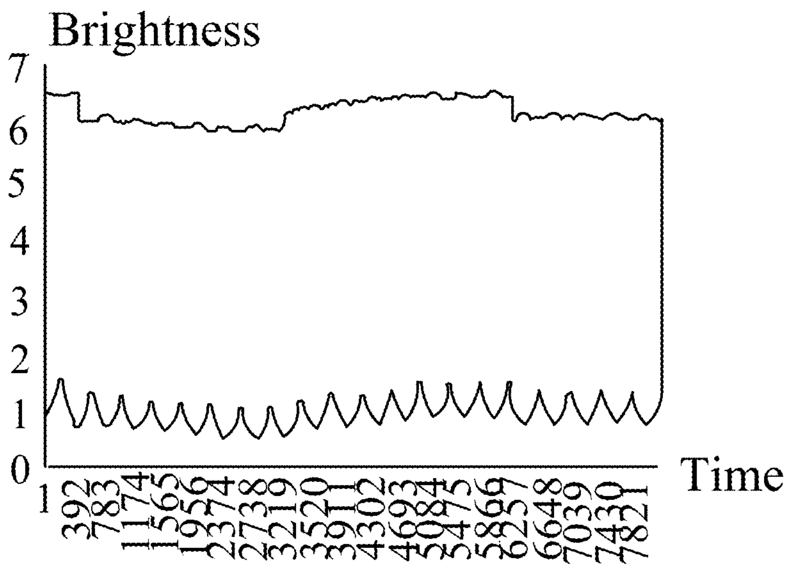
FIG. 11 is a simulation graph of brightness of a second measurement position in a third display sub-region before compensation according to one or more embodiments of the present application.
Figure 12:
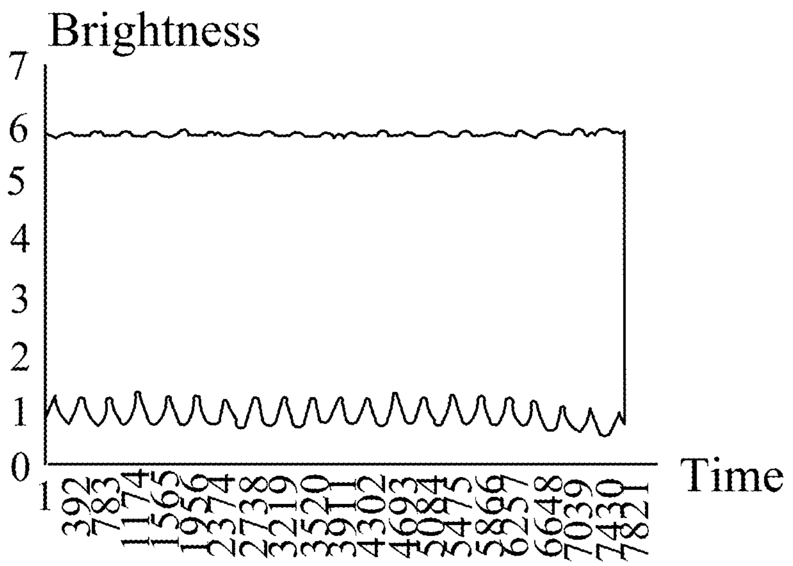
FIG. 12 is a simulation graph of brightness of a first measurement position in a first display sub-region after compensation according to one or more embodiments of the present application.
Figure 13:
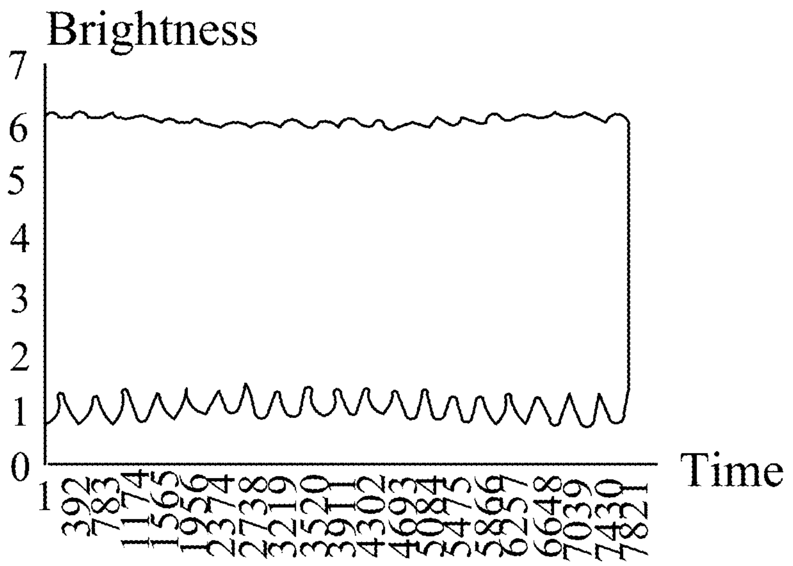
FIG. 13 is a simulation graph of brightness of a second measurement position in a third display sub-region after compensation according to one or more embodiments of the present application.

FIG. 10 is a simulation graph of brightness of a first measurement position in a first display sub-region before compensation according to one or more embodiments of the present application. FIG. 11 is a simulation graph of brightness of a second measurement position in a third display sub-region before compensation according to one or more embodiments of the present application. Referring to FIG. 2, the second measurement position 5 is located in the third display sub-region 3. FIG. 12 is a simulation graph of brightness of a first measurement position in a first display sub-region after compensation according to one or more embodiments of the present application. FIG. 13 is a simulation graph of brightness of a second measurement position in a third display sub-region after compensation according to one or more embodiments of the present application. In FIGS. 10 to 13, the horizontal axis denotes the time, and the vertical axis denotes the brightness of the measurement positions. FIGS. 12 and 13 show the simulation graphs of the brightness of the first measurement position 4 and the brightness of the second measurement position 5 that are obtained when images in the display panel are refreshed using the driving method for a display panel in the preceding embodiments. Referring to FIGS. 2 and 10 to 13, before the compensation, when the images are switched in the second display sub-region 2, changes in the brightness of the first display sub-region 1 and the third display sub-region 3 are large, easily causing screen flickering phenomena. After the display panel is driven using the preceding driving method, when the images are switched in the second display sub-region 2, the changes in the brightness of the first display sub-region 1 and the third display sub-region 3 are not large, thereby improving the screen flickering phenomena in the first display sub-region 1 and the third display sub-region 3 and improving the display effect when the display panel is displayed in partitions and multiple frequencies.

Figure 14:
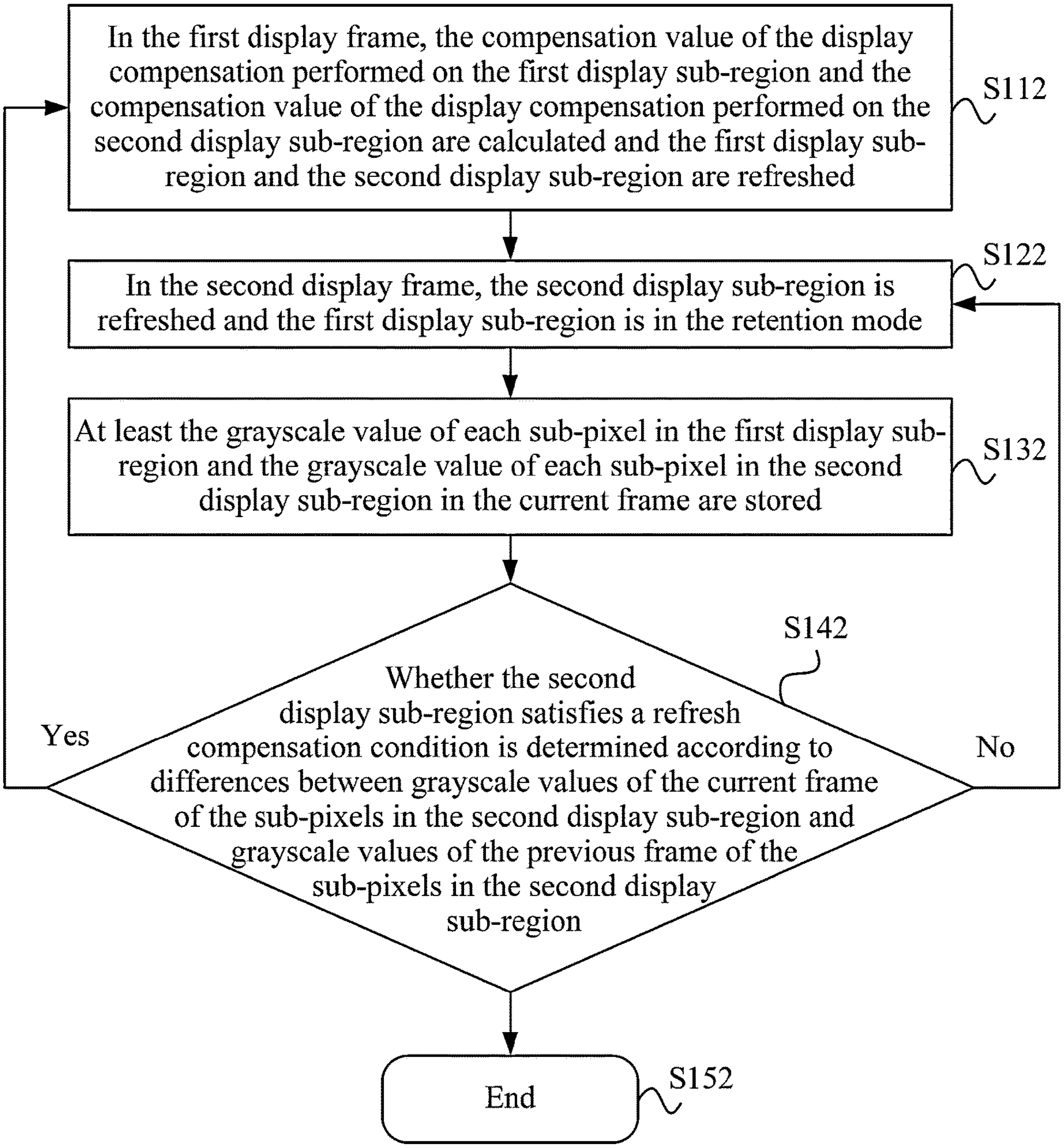
FIG. 14 is yet another flowchart of a driving method for a display panel according to one or more embodiments of the present application.

In view of the preceding driving method for a display panel, one or more embodiments of the present application provide a specific driving flow. FIG. 14 is yet another flowchart of a driving method for a display panel according to one or more embodiments of the present application. Referring to FIG. 14, the driving method includes the steps below.

In S112, in the first display frame, the compensation value of the display compensation performed on the first display sub-region and the compensation value of the display compensation performed on the second display sub-region are calculated, and the first display sub-region and the second display sub-region are refreshed.

In S122, in the second display frame, the second display sub-region is refreshed, and the first display sub-region is in the retention mode.

In S132, the grayscale value of each sub-pixel in the first display sub-region in the current frame and the grayscale value of each sub-pixel in the second display sub-region in the current frame are at least stored.

In S142, whether a refresh compensation condition is satisfied is determined according to differences between grayscale values of the current frame of the sub-pixels in the second display sub-region and grayscale values of the previous frame of the sub-pixels in the second display sub-region.

If the refresh compensation condition is satisfied, S112 is repeated until one refresh cycle T is completed, and the method goes to S152, that is, end. In this case, the processing of one cycle of partitions and multiple frequencies is completed, or the flow may also enter the next refresh cycle. If the refresh compensation condition is not satisfied, S122 is repeated. The refresh compensation condition is the change degree of the display-related parameters of the at least two refresh frames in the second display sub-region greater than the set degree.

S112, S122, S132 and S142 may be adjusted according to requirements, which is not limited in the embodiments of the present application. For example, S112 is executed before or after S122, or S112 is executed between multiple S122. For example, S122 may be executed multiple times after S112 is executed. For example, S132 is executed once when S112 is executed. For example, S132 is executed once when S122 is executed. For example, S142 is executed once before each S112 is executed. For example, S142 is executed once before each S122 is executed.

Figure 15:
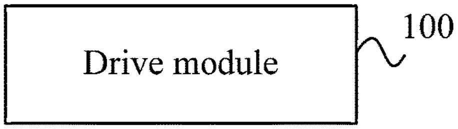
FIG. 15 is a diagram illustrating the structure of a driving apparatus for a display panel according to one or more embodiments of the present application.

One or more embodiments of the present application further provide a driving apparatus for a display panel. The driving apparatus for a display panel may be configured to perform the driving method for a display panel in the preceding embodiments. A display region of the display panel at least includes a first display sub-region and a second display sub-region. FIG. 15 is a diagram illustrating the structure of a driving apparatus for a display panel according to one or more embodiments of the present application. Referring to FIG. 15, the driving apparatus for a display panel includes a drive module 100.

The drive module 100 is configured to, in the case where a change degree of display-related parameters of at least two refresh frames in the second display sub-region is greater than a set degree, refresh the first display sub-region and/or perform display compensation on the first display sub-region.

Optionally, the display-related parameter includes at least one of a grayscale value, a gamma register value, and a data voltage.

The driving apparatus for a display panel has the same beneficial effects as the driving method for a display panel. Details are not repeated herein.

Figure 16:
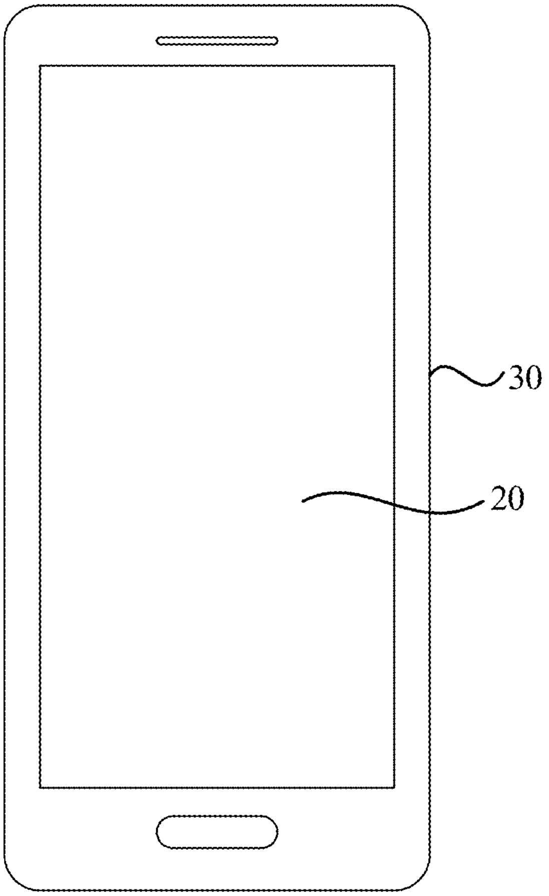
FIG. 16 is a diagram illustrating the structure of a display device according to one or more embodiments of the present application.

One or more embodiments of the present application further provide a display device. FIG. 16 is a diagram illustrating the structure of a display device according to one or more embodiments of the present application. Referring to FIG. 16, the display device 30 includes a display panel 20 and a driving apparatus. The driving apparatus for a display panel is configured to perform the preceding driving method for a display panel. The driving apparatus may be the driving apparatus in the preceding embodiments. The display device 30 may be a mobile phone as shown in FIG. 16 or may also be a computer, a television, or an intelligent wearable display device, which is not specifically limited in the embodiment of the present application. The display device has the same beneficial effects as the driving method for a display panel. Details are not repeated herein.

Exemplarily, a drive module 100 may include a display driver chip. In the case where a change degree of display-related parameters of at least two refresh frames in a second display sub-region is greater than a set degree, the display driver chip may output corresponding control signals to scan circuits to control the scan circuits to output second scan signals Scan2 to a first display sub-region and may output corresponding data voltages to pixel circuits in the first display sub-region to refresh the first display sub-region.

Exemplarily, the drive module 100 may include the display driver chip and a power chip. In the case where the change degree of the display-related parameters of the at least two refresh frames in the second display sub-region is greater than the set degree, the display driver chip may output the corresponding control signals to the scan circuits to control the scan circuits to output third scan signals Scan3 to the first display sub-region while outputting corresponding control signals to the power chip to control the power chip to output compensated second reset signals Vref2 to the pixel circuits in the first display sub-region to perform display compensation on the first display sub-region.

Exemplarily, the drive module 100 may include the display driver chip. In the case where the change degree of the display-related parameters of the at least two refresh frames in the second display sub-region is greater than the set degree, the display driver chip may output the corresponding control signals to the scan circuits to control the scan circuits to output the second scan signals Scan2 to the first display sub-region and may output compensated data voltages to the pixel circuits in the first display sub-region to refresh the first display sub-region and perform the display compensation on the first display sub-region.

It is to be understood that various forms of processes shown in the preceding may be adopted with steps reordered, added, or deleted. For example, the steps described in the present application may be performed in parallel, sequentially or in different sequences, as long as the desired results of the technical solutions of the present application can be achieved, and no limitation is imposed herein.

The preceding embodiments do not limit the scope of the present application. It is to be understood by those skilled in the art that various modifications, combinations, sub-combinations, and substitutions may be performed according to design requirements and other factors. Any modification, equivalent substitution, improvement or the like that is made within the spirit and principle of the present application is within the scope of the present application.

What is claimed is:

1. A driving method for a display panel, wherein a display region of the display panel at least comprises a first display sub-region and a second display sub-region, and the driving method for the display panel comprises:

in response to a change degree of display-related parameters of at least two refresh frames in the second display sub-region being greater than a set degree, performing display compensation on the first display sub-region, wherein performing the display compensation on the first display sub-region comprises:

determining a voltage drop on a first power voltage signal line according to a resistor string model of the display panel, a position of a sub-pixel in the first display sub-region in the display panel and a current value on the first power voltage signal line corresponding to the sub-pixel in the first display sub-region, wherein the current value on the first power voltage signal line corresponding to the sub-pixel in the first display sub-region is at least determined according to a grayscale value of a current frame of a sub-pixel in the second display sub-region;

determining a compensated data voltage of the sub-pixel in the first display sub-region according to a grayscale value of a current frame of the sub-pixel in the first display sub-region and the voltage drop on the corresponding first power voltage signal line; and writing the compensated data voltage into the sub-pixel in the first display sub-region, wherein the first power voltage signal line is electrically connected to the sub-pixel in the first display sub-region and a sub-pixel in the second display sub-region;

wherein the voltage drop E on the first power voltage signal line satisfies that $E=I*R$; and wherein I denotes a screen current determined according to a grayscale value of a sub-pixel in the second display sub-region located in the same column as the sub-pixel in the first display sub-region in the current frame, and R denotes a resistor of the first power voltage signal line in a position of the sub-pixel in the first display sub-region and is determined by the resistor string model and the position of the sub-pixel in the first display sub-region.

2. The driving method for a display panel of claim 1, wherein the driving method for the display panel comprises:

in response to the change degree of the display-related parameters of the at least two refresh frames in the second display sub-region being greater than the set degree, refreshing the first display sub-region to increase a number of refresh times of the first display sub-region.

3. The driving method for a display panel of claim 1, wherein the driving method for the display panel comprises:

in response to the change degree of the display-related parameters of the at least two refresh frames in the second display sub-region being less than or equal to the set degree, refreshing the first display sub-region once within a first time period, wherein the first time period is equal to a refresh cycle of the first display sub-region; and in response to the change degree of the display-related parameters of the at least two refresh frames in the second display sub-region being greater than the set degree, refreshing the first display sub-region at least twice within the first time period.

4. The driving method for a display panel of claim 1, wherein the driving method for the display panel comprises:

in response to the change degree of the display-related parameters of the at least two refresh frames in the second display sub-region being greater than the set degree, adjusting a compensation value of the display compensation performed on the first display sub-region, and refreshing the first display sub-region;

in a first display frame, calculating the compensation value of the display compensation performed on the first display sub-region and a compensation value of display compensation performed on the second display sub-region, and refreshing the first display sub-region and the second display sub-region; and in a second display frame, refreshing the second display sub-region, and the first display sub-region is in a retention mode;

wherein in the second display frame, the compensation value of the display compensation performed on the second display sub-region is a compensation value of display compensation performed on the second display sub-region in a previous frame.

5. The driving method for a display panel of claim 1, wherein one or more second display frames are set between two adjacent first display frames;

wherein the driving method for the display panel comprises:

in response to the change degree of the display-related parameters of the at least two refresh frames in the second display sub-region being greater than the set degree, refreshing the first display sub-region to increase a number of first display frames;

in response to the change degree of the display-related parameters of the at least two refresh frames in the second display sub-region being less than or equal to the set degree, providing one first display frame within a first time period, wherein the first time period is equal to a refresh cycle of the first display sub-region; in response to the change degree of the display-related parameters of the at least two refresh frames in the second display sub-region being greater than the set degree, providing at least two first display frames within the first time period; and wherein the at least two refresh frames comprise a current frame and at least one frame previous to and adjacent to the current frame, a time interval between the current frame and a previous first display frame is less than the first time period, and in response to the change degree of the display-related parameters of the at least two refresh frames in the second display sub-region being greater than the set degree, the current frame is the first display frame; in response to the change degree of the display-related parameters of the at least two refresh frames in the second display sub-region being less than or equal to the set degree, the current frame is the second display frame.

6. The driving method for a display panel of claim 1, wherein a display-related parameter of the display-related parameters comprises a grayscale value;

in response to a change degree of grayscale values of the at least two refresh frames in the second display sub-region being greater than a set degree, a drive current of a sub-pixel in the first display sub-region decreases under a compensated data voltage of the first display sub-region, when a change trend decreases; and in response to a change degree of grayscale values of the at least two refresh frames in the second display sub-region being greater than a set degree, the drive current of the sub-pixel in the first display sub-region increases under the compensated data voltage of the first display sub-region, when the change trend increases.

7. The driving method for a display panel of claim 1, wherein the display region of the display panel further comprises a third display sub-region, the third display sub-region having a same refresh rate as the first display sub-region; and wherein the driving method further comprises performing the display compensation on the third display sub-region in response to the change degree of the display-related parameters of the at least two refresh frames in the second display sub-region being greater than the set degree.

8. The driving method for a display panel of claim 1, wherein the display panel further comprises a frequency-modulating scan circuit; and wherein the driving method further comprises transmitting, by the frequency-modulating scan circuit, a scan signal comprising a conduction pulse to a to-be-refreshed region of the display panel and a continuous cut-off potential to a retention region of the display panel.

9. The driving method for a display panel of claim 1, wherein the driving method further comprises:

in response to the change degree of the display-related parameters of the at least two refresh frames in the second display sub-region being greater than the set degree, performing compensation on an initialization voltage of a first electrode of a light-emitting device in a sub-pixel in the first display sub-region.

10. The driving method for a display panel of claim 1, wherein the at least two refresh frames in the second display sub-region comprise a current frame and k frames previous to and adjacent to the current frame, wherein k is an integer selected from the group consisting of 2, 3, 4, and 5; and wherein performing the display compensation on the first display sub-region is performed in the current frame in response to a sum of change degrees of the display-related parameters of the current frame and the k frames previous to and adjacent to the current frame in the second display sub-region being greater than the set degree.

11. The driving method for a display panel of claim 1, wherein the second display sub-region comprises m sub-pixels, wherein m is a positive integer greater than 1; and wherein in response to the change degree of the display-related parameters of the at least two refresh frames in the second display sub-region being greater than the set degree, performing the display compensation on the first display sub-region comprises:

in response to an absolute value of an average value of differences between display-related parameters of a current frame of the m sub-pixels in the second display sub-region and display-related parameters of a previous frame of the m sub-pixels in the second display sub-region being greater than a set difference, performing the display compensation on the first display sub-region in the current frame.

12. The driving method for a display panel of claim 11, wherein the method further comprises:

in response to the absolute value of the average value of the differences between the display-related parameters of the current frame of the m sub-pixels in the second display sub-region and the display-related parameters of the previous frame of the m sub-pixels in the second display sub-region being less than or equal to the set difference, not changing a type of the current frame of the first display sub-region 1, and not changing a number of refresh times of the first display sub-region 1.

13. The driving method for a display panel of claim 1, wherein a display-related parameter of the display-related parameters comprises at least one of a grayscale value, a gamma register value, and a data voltage;

a refresh rate of the first display sub-region is less than a refresh rate of the second display sub-region, and the driving method further comprises storing display-related parameters of a current frame of a sub-pixel in the second display sub-region and one or more frames previous to and adjacent to the current frame.

14. The driving method for a display panel of claim 13, wherein the driving method for the display panel comprises:

in response to the change degree of the display-related parameters of the at least two refresh frames in the second display sub-region being greater than the set degree, performing the display compensation on the first display sub-region by performing compensation on a data voltage of the first display sub-region;

wherein a compensation value of the data voltage of the first display sub-region is related to a voltage drop on a first power voltage signal line.

15. The driving method for a display panel of claim 14, wherein a sub-pixel in the first display sub-region comprises a pixel circuit and a light-emitting device, and the pixel circuit is connected between the first power voltage signal line and the light-emitting device; and the compensation value of the data voltage of the first display sub-region is equal to the voltage drop on the first power voltage signal line.

16. The driving method for a display panel of claim 15, wherein the compensated data voltage is Vdata'=Vdata−E=Vdata−I*R, wherein Vdata denotes a data voltage of the sub-pixel in the first display sub-region before the compensation in the current frame.

17. A driving apparatus for a display panel, wherein a display region of the display panel at least comprises a first display sub-region and a second display sub-region, and the driving apparatus for a display panel comprises:

a display driver chip configured to, in a case where a change degree of display-related parameters of at least two refresh frames in the second display sub-region is greater than a set degree, perform display compensation on the first display sub-region, wherein performing the display compensation on the first display sub-region comprises:

determining a voltage drop on a first power voltage signal line according to a resistor string model of the display panel, a position of a sub-pixel in the first display sub-region in the display panel and a current value on the first power voltage signal line corresponding to the sub-pixel in the first display sub-region, wherein the current value on the first power voltage signal line corresponding to the sub-pixel in the first display sub-region is at least determined according to a grayscale value of a current frame of a sub-pixel in the second display sub-region;

determining a compensated data voltage of the sub-pixel in the first display sub-region according to a grayscale value of a current frame of the sub-pixel in the first display sub-region and the voltage drop on the corresponding first power voltage signal line; and writing the compensated data voltage into the sub-pixel in the first display sub-region, wherein the first power voltage signal line is electrically connected to the sub-pixel in the first display sub-region and a sub-pixel in the second display sub-region;

wherein the voltage drop E on the first power voltage signal line satisfies that E=I*R; and wherein I denotes a screen current determined according to a grayscale value of a sub-pixel in the second display sub-region located in the same column as the sub-pixel in the first display sub-region in the current frame, and R denotes a resistor of the first power voltage signal line in a position of the sub-pixel in the first display sub-region and is determined by the resistor string model and the position of the sub-pixel in the first display sub-region.

18. The driving apparatus for a display panel of claim 17, wherein in the case where the change degree of the display-related parameters of at least two refresh frames in the second display sub-region is greater than the set degree, the display driver chip is configured to output corresponding control signals to scan circuits to control the scan circuits to output second scan signals to a first display sub-region and output corresponding data voltages to pixel circuits in the first display sub-region to refresh the first display sub-region.

19. The driving apparatus for a display panel of claim 17, wherein the driving apparatus further comprises a power chip;

in the case where the change degree of the display-related parameters of the at least two refresh frames in the second display sub-region is greater than the set degree, the display driver chip is configured to output corresponding control signals to scan circuits to control the scan circuits to output third scan signals to the first display sub-region and output corresponding control signals to the power chip to control the power chip to output compensated second reset signals to pixel circuits in the first display sub-region to perform display compensation on the first display sub-region.

20. A display device, comprising a display panel and a driving apparatus, wherein a display region of the display panel at least comprises a first display sub-region and a second display sub-region, wherein the driving apparatus is configured to perform a driving method for a display panel;

wherein the driving method for a display panel comprises:

in response to a change degree of display-related parameters of at least two refresh frames in the second display sub-region being greater than a set degree, performing display compensation on the first display sub-region, wherein performing the display compensation on the first display sub-region comprises:

determining a voltage drop on a first power voltage signal line according to a resistor string model of the display panel, a position of a sub-pixel in the first display sub-region in the display panel and a current value on the first power voltage signal line corresponding to the sub-pixel in the first display sub-region, wherein the current value on the first power voltage signal line corresponding to the sub-pixel in the first display sub-region is at least determined according to a grayscale value of a current frame of a sub-pixel in the second display sub-region;

determining a compensated data voltage of the sub-pixel in the first display sub-region according to a grayscale value of a current frame of the sub-pixel in the first display sub-region and the voltage drop on the corresponding first power voltage signal line; and writing the compensated data voltage into the sub-pixel in the first display sub-region, wherein the first power voltage signal line is electrically connected to the sub-pixel in the first display sub-region and a sub-pixel in the second display sub-region;

wherein the voltage drop E on the first power voltage signal line satisfies that E=I*R; and wherein I denotes a screen current determined according to a grayscale value of a sub-pixel in the second display sub-region located in the same column as the sub-pixel in the first display sub-region in the current frame, and R denotes a resistor of the first power voltage signal line in a position of the sub-pixel in the first display sub-region and is determined by the resistor string model and the position of the sub-pixel in the first display sub-region.

* * * * *